3,560,193
ARSONATE HERBICIDE COMPOSITIONS
John H. Kirch, Roslyn, Pa., assignor to Amchen Products, Inc., Ambler, Pa.
No Drawing. Continuation-in-part of applications Ser. No. 597,204, Nov. 28, 1966, and Ser. No. 718,251, Apr. 2, 1968. This application Aug. 25, 1969, Ser. No. 852,897
The portion of the term of the patent subsequent to Sept. 9, 1986, has been disclaimed
Int. Cl. A01n 9/20
U.S. Cl. 71—97                                                                       5 Claims

ABSTRACT OF THE DISCLOSURE

A herbicidal composition and method of use for eradicating perennial woody and brush species involving a composition including an arsonate compound and a phenoxyalkanoic compound.

---

This application is a continuation-in-part application based on application Ser. No. 718,251, filed Apr. 2, 1968 now U.S. Pat. No. 3,466,163 and entitled "Efficient Arsonate Herbicide Composition and Method of Use," which is a continuation-in-part of application Ser. No. 597,204, filed Nov. 28, 1966, now abandoned.

The present invention relates to arsonate herbicidal compositions and processes, and more particularly, it relates to compositions and processes for the control or eradication of noxious perennial vegetation.

Control or eradication of perennial woody plants or perennial brush species has uniformly been effected through the use of one or more chlorinated phenoxyalkanoic acids, particularly 2,4,5-trichlorophenoxyacetic acid, or functional derivatives thereof. Although such acids generally provided satisfactory control, it has frequently been necessary to apply them at least twice throughout the growing season. In any event, the effects realized from utilization of phenoxy-type herbicides became apparent only during the season when treatment occurred, and regrowth from plants not killed is very common in subsequent growing seasons.

Over a period of years it has been observed that certain perennial brush species display appreciable resistance to these phenoxy herbicides, so that diminishing degrees of effective herbicide application have been encountered. This situation has led to serious problems in the control of vegetation along rights-of-way such as, for example, utility power lines and railroad lines.

Accordingly, there exists a need for an effective herbicidal agent which will provide a high degree of control over otherwise hard-to-kill perennial plants. Moreover, there exists a need for effective herbicidal agents which not only are capable of application on an economical basis without danger of harm or injury to beneficial vegetation or wildilfe, but which also will have a long-lasting effect on treated plants.

It has been surprisingly discovered that an admixture consisting of:

(1) from 0.15 to 4 parts (calculated as $R^1$-$AsO_3H$) of an arsonate compound having the structure:

(Formula I)

wherein $R^1$ is an alkyl group of from 1 to 3 total carbon atoms; $R^2$ and $R^3$ are selected from the group consisting of H, $NH_4$, organic amines, alkali metals such as sodium and potassium, and one ion of a divalent metal such as calcium, zinc, magnesium, strontium, barium and cadmium; with, (2) one part of a phenoxyalkanoic acid compound and corresponding functional derivatives of the structure;

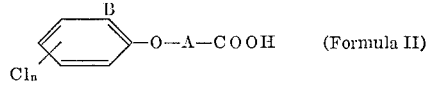
(Formula II)

wherein B is chlorine or methyl; A is selected from the group consisting of —$CH_2$—, —$CH(CH_3)$—, —$CH(CH_3)\cdot CH_2$ and —$CH_2$—$CH_2$—$CH_2$— and $n$ is an integer of 1 or 2, with the chlorine atom or atoms appearing at one or two of the 4 and 5 positions on the benzene nucleus;

When applied to woody plants, it is surprisingly capable of providing a high level of control over otherwise hard-to-kill perennial brush species.

This discovery was particularly unexpected in view of the fact that arsonic acid and its derivatives (hereinafter referred to as arsonate compounds, as exemplified by Formula I above) are essentially ineffective as herbicidal agents when applied alone to perennial plants species, particularly when applied at the rates employed herein. Such arsonate compounds have long been recognized as being effective on monocotyledonous plants rather than on dicotyledonous species as may be appreciated from a consideration of U.S. Pats. 2,678,265, 2,030,199, 3,056,688 and 3,068,088.

Typical arsonate compounds falling within Formula I above and particularly suitable for use in the process of this invention include methanearsonic acid (MAA), monosodium acid methanearsonate (MSMA), disodium methanearsonate (DSMA), and the calcium salt of methane arsonic acid (CMA), the preparation of which is well known in the art.

Other typical arsonate compounds falling within Formula I are those amine salts formed from an amine of the structure

(Formula III)

wherein $R^4$, $R^5$ and $R^6$ are selected from the group consisting of hydrogen, alkyl groups, and hydroxyalkyl-polyalkoxy groups.

When one or more of $R^4$, $R^5$ and $R^6$ is an alkyl group it may be substituted or unsubstituted, saturated or unsaturated, straight or branched chain. Preferably, it contains from 2 to 22 carbon atoms. Examples are ethyl, hydroxyethyl, propyl, hexyl, lauryl, stearyl, oleyl and "mixtures" of aliphatic radicals derived from soybean oil, coconut oil, tallow, wood resin and tall oil.

In addition the groups $R^4$, $R^5$ and/or $R^6$ may be hydroxyalkylpolyalkoxy groups, for example hydroxyethylpolyethoxy and hydroxypropylpolypropoxy; the appropriate compounds may be considered as being the reaction products of ammonia or an amine $R^4NH_2$ or $R^4R^5NH$ and an alkylene oxide such as ethylene oxide or propylene oxide.

Typical amines falling within Formula III are diethanolamine, triethanolamine and the propoxylated derivative sold under the name "Propomeen C 12."

The use of these alkanearsonic acid amine salts which are derived from alkoxylated derivatives such as that sold under the name "Propomeen C 12" is particularly advantageous in that an excess of the chosen alkanearsonic acid can be incorporated into the phenoxyalkanoic admixture over and above that amount required to neutralize the chosen amine. The resultant admixtures are generally stable, and very useful in the preparation of concentrated formulations, which can be diluted or emulsified without any separation of the active constituents.

The phenoxyalkanoic acid compound may be 2-methyl-4-chlorophenoxyacetic acid (MCPA), 2,4-dichlorophenoxyacetic acid (2,4-D), or 2,4,5-trichlorophenoxyacetic acid (2,4,5-T) or the corresponding propionic and butyric acids. Reference in this specification, as well as in the claims appended hereto, to "phenoxyalkanoic acid compound" will be understood as including not only these basic acids per se, but also their commonly known functional derivatives, such as for example the alkali metal, ammonium and substituted ammonium salts, amides and substituted amides, amines and esters, including alkoxyalkanol esters popularly known as "low volatile" esters. In connection with the foregoing, the term "acid equivalent" is a convenient way to provide a basis for writing directions in reference to pounds of material per acre. Hence, whether the herbicidal material, the phenoxyalkonic acid compound or the arsonic acid derivative is the alkali metal, ammonium, etc., salt or derivative, reference to quantities such as pounds per acre or parts by weight are made on the basis of the equivalent amount of herbicide acid.

It is important, in the operation of the process of this invention, that the respective amounts of arsonic acid, derivatives and phenoxyalkanoic acid compounds be utilized in the proportions indicated hereinabove. Where the amount of arsonic acid derivative used is less than 0.15 part thereof for each part of phenoxyalkanoic acid compound, the surprising enhancement of herbicidal activity with respect to perennial plants will not be realized.

Conversely, the use of more than 4 parts of arsonic acid derivative per part of phenoxyalkanoic acid compound should be avoided since it has been found that diminished control or eradication of noxious brush species results from such practice.

Commercial formulations including the herbicidal admixtures of the present invention—these formulations being used in the Examples set forth hereinafter and as actually used in practice—may be easily prepared in the field. A preferred formulation technique involves using a well known emulsifying agent to emulsify the phenoxyalkanoic acid compound in either a water-in-oil emulsion or vice versa at ordinary temperatures. The arsonic acid derivative, or "arsonate," is then simply added to the emulsion to complete the preparation. The emulsion itself may be applied to vegetation using spraying equipment that is well known and widely used in practice.

An alternate technique for producing a formulation involves simply dissolving in water a soluble salt of the phenoxyalkanoic acid compound and the arsonate. This technique will be particularly useful, because of its simplicity, when employing the relatively cheap water soluble phenoxyalkanoic amine salts.

While the simultaneous application in a single formulation of the various components of the herbicidal admixtures of the present invention is greatly preferred, it is within the contemplation of the present invention that the various components be separately applied at about the same time.

In order to illustrate the surprising results demonstrated by the process of this invention there are presented below a series of experimental test results and formulations which are shown merely by way of illustration and which are not intended in any way to be construed as a limitation of this invention.

EXAMPLE I

A stand of seedling through mature red maple trees (*Acer rubrum*) was sprayed during the growing season with a commercial herbicidal formulation containing both 2,4-D and 2,4,5-T as the active herbicide ingredients. Spraying was effected so as to apply an equivalent of 8 lbs. of each herbicide, for a total application of 16 lbs. of active herbicide acids per acre. An application was also made on an adjacent tract which contained seedling through mature red maple trees, which application utilized a commercial formulation containing both 2,4-D and 2,4,5-T and also containing MSMA. The latter spray application was effected so as to apply, per acre, an equivalent of 6 lbs. each of the phenoxyalkanoic acid compounds and 8 lbs. of the arsonate compound. A third tract, with a similar population of red maple trees, was sprayed with an aqueous solution of MSMA so as to apply an equivalent of 12 lbs. per acre of this compound to the treated tract.

Eleven months following spray application, visual inspection of these three tracts showed no noticeable effect on the tract treated only with MSMA. A noticeable, but low level, essentially non-permanent herbicidal effect was observed (some harm, but no substantial fatal effects) on the tract sprayed with the combined 2,4-D and 2,4,5-T phenoxyacetic acids, whereas a pronounced herbicidal effect was observed on red maple trees in the tract which was sprayed with both the phenoxyalkanoic acid compounds and the arsonate compound. Close comparisons of the tracts showing herbicidal effect indicated fully 200% increase in herbicidal control over the phenoxyacetic acids per se in favor of the tract which was sprayed with both the acetic acid compounds and the arsonate compound. The pure MSMA treatment by itself had no effect.

EXAMPLE II

Brush plots containing seedling through mature trees, consisting primarily of the species sassafras (*Sassafras albidun*), pitch pine (*Pinus resinosa*) and black locust (*Robinia pseudoacacia*), were sprayed during the growing season with a commercial herbicidal formulation containing both 2,4-D and 2,4,5-T as the active ingredients. Spraying was effected so as to apply an equivalent of 8 lbs. of each herbicide, for a total application of 16 lbs. of active herbicide acid per acre. An application was also made on an adjacent tract which contained the three above seedlings utilizing a formulation containing both 2,4-D and 2,4,5-T and also MSMA. The latter spray application was effected so as to apply per acre an equivalent of 6 lbs. each of the phenoxyalkanoic acid compounds and 8 lbs. of the arsonate compound. A third tract with the three above seedlings was sprayed with an aqueous solution of MSMA so as to apply an equivalent of 8 lbs. per acre of this compound to the treated tract.

Eleven months following spray application, that is during the following growing season, an inspection was made of the treated plots. It was observed that no noticeable herbicidal effect was detected in the plot treated with the 8 lbs./acre of the MSMA. Outstanding herbicidal control was obtained from the plot which had been treated with 6 lbs. each acre of 2,4-D and 2,4,5-T plus the 8 lbs./acre of MSMA, as compared with the plot treated only with the 16 lbs. per acre of combined 2,4-D and 2,4,5-T. The relative increase in total herbicidal control was greater than 300% in favor of the mixed phenoxyacetic acid/arsonate herbicide treatment. The pure phenoxyacetic acid treatment was unsatisfactory as noted in Example I.

EXAMPLE III

Brush plots containing trees of the species white oak (*Quercus alba*), chestnut oak (Quercus spp.), red maple (*Acer rubrum*), and sourwood (*Oxydendran*) were treated during the growing season with 12 lbs./acre of a commercial herbicidal formulation containing 2,4-dichlorophenoxyacetic acid (2,4-D) and 2,4,5-trichlorophenoxyacetic acid (2,4,5-T) so as to apply thereto the equivalent of 12 lbs./acre of combined active phenoxyacetic acids. Similar plots were treated with the same commercial formulation of mixed phenoxyalkanoic acid compounds but also with MSMA applied at the rate of 8 lbs./acre. Additionally, similar plots were sprayed only with MSMA at the equivalent of 8 lbs./acre.

Eleven months following spray application, inspection of the plots showed no herbicidal effect on the plot treated only with MSMA, whereas a 200 to 300% increase in herbicidal control over these brush species was observed in the plot which had been sprayed with both the phenoxyalkanoic acid compound and the MSMA compound as compared with the plot upon which only the combined phenoxy herbicide acids had been sprayed. The pure phenoxyacetic acid treated was unsatisfactory as noted in Example I.

EXAMPLE IV

Brush plots containing seedling through mature red maple (*Acer rubrum*) trees were sprayed with commercial formulations of phenoxyalkanoic acid compounds and/or aqueous solutions of various arsonate compounds in accordance with the following table. All spray applications were made when the trees were in the active state of growth and observations were recorded thirteen months after spraying, that is during the succeeding growing season. The percent control for the respective treatments is indicated in the following table wherein the particular active ingredients utilized are identified by the following key:

MSMA—monosodium acid methanearsonate.
DSMA—disodium acid methanearsonate.
2,4-D—2,4-dichlorophenoxyacetic acid.
2,4,5-T—2,4,5-trichlorophenoxyacetic acid.

TABLE I

| Plot No.: | Active ingredient used Type | Lbs./acre | Percent control of brush species |
|---|---|---|---|
| 1 | MSMA | 12 | None |
| 2 | DSMA | 6 | None |
| 3 | 2,4-D | 6 | 10 |
| 4 | 2,4,5-T | 6 | 40 |
| 5 | 2,4-5-D+DSMA | 3+6 | 100 |
| 6 | 2,4,5-T+DSMA | 3+0.75 | 100 |
| 7 | 2,4,5-T+DSMA | 1.5+3 | 100 |
| 8 | 2,4,5-T+DSMA | 3+1.5 | 100 |
| 9 | 2,4,5-T+DSMA | 3+3 | 100 |
| 10 | 2,4,5-T+DSMA | 3+6 | 100 |
| 11 | 2,4,5-T+DSMA | 6+3 | 100 |
| 12 | 2,4,5-T | 3 | 20 |
| 13 | 2,4,5-T+MSMA | 3+1.5 | 100 |
| 14 | 2,4,5-T+MSMA | 3+3 | 100 |
| 15 | 2,4,5-T+MSMA | 3+4.5 | 100 |
| 16 | 2,4,5-T+MSMA | 1.5+3 | 100 |

EXAMPLE V

Brush plots containing seedling through mature trees, consisting primarily of the species red maple (*Acer rubrum*) and Virginia pine (*Pinus virgiana*) were sprayed during the growing season with commercial formulations of phenoxyalkanoic acid compounds and/or aqueous solutions of arsonate compounds in accordance with the following table. Observations of the degree, if any, of herbicidal control were made fourteen months following spray application, that is during the succeeding growing season. These observations are recorded below in Table II, wherein the following key is employed for purposes of identifying the particular active ingredients employed:

MSMA—monosodium acid methanearsonate.
CMA—calcium acid methanearsonate.
2,4-D—2,4-dichlorophenoxyacetic acid.
2,4,5-T—2,4,5-trichlorophenoxyacetic acid.

TABLE II

| Plot No.: | Active ingredient used Type | Lbs./acre | Percent Improvement in control of brush species (as compared with phenoxyacetic acids alone) |
|---|---|---|---|
| 1 | MSMA | 12 | |
| 2 | 2,4-D plus 2,4,5-T | 6 / 6 | |
| 3 | MSMA plus 2,4-D plus 2,4,5-T | 8 / 6 / 6 | 150 |
| 4 | CMA | 12 | |
| 5 | 2,4-D plus 2,4,5-T | 6 / 6 | |
| 6 | CMA plus 2,4,5-T | 1.5 / 3 | 200 |

EXAMPLE VI

The following formulations, which effectively contain an amine salt of the alkylarsonic acid chosen, are particularly useful as concentrates.

| | Gallons | Lbs. | Percent by weight |
|---|---|---|---|
| Formulation 1: | | | |
| 2,4-D | | 4.034 | 36.38 |
| Methanearsonic acid (100%) | | 1.009 | 9.10 |
| Diethanolamine (60% aqueous) | 0.643 | 5.781 | 52.14 |
| Water | 0.026 | 0.264 | 2.38 |
| Total | 1.000 | 11.088 | 100.00 |
| Formulation 2: | | | |
| 2,4-D Acid (100%) | | 2.017 | 19.53 |
| Methanearsonic acid (97%) | | 0.998 | 9.66 |
| Triethanolamine (100%) | 0.377 | 3.559 | 34.46 |
| Water | 0.451 | 3.753 | 36.35 |
| Total | 1.000 | 10.327 | 100.00 |
| Formulation 3: | | | |
| 2,4-D Acid (69.3%) as butyl cellosolve ester | 0.141 | 1.441 | 16.35 |
| 2,4,5-D acid (69.5%) as butyl cellosolve ester | 0.133 | 1.437 | 16.30 |
| Methanearsonic acid | | 0.644 | 7.31 |
| Propomeen C 12 | 0.267 | 1.997 | 22.65 |
| Agricultural oils | 0.432 | 3.297 | 37.39 |
| Total | 1.000 | 8.816 | 100.00 |
| Formulation 4: | | | |
| 2,4-D acid | | 1.009 | 9.45 |
| 2,4-DP acid | | 0.757 | 7.09 |
| Methanearsonic acid | | 0.968 | 9.07 |
| Triethanolamine | 0.416 | 0.416 | 36.83 |
| Water | 0.481 | 4.008 | 37.56 |
| Total | 1.000 | 10.672 | 10.00 |

In using each of the four foregoing formulations, significant control of brush species in the manner of Examples I to V was achieved as compared with the individual active ingredients. Also the concentrates of the four formulations were very stable and easily diluted for spray purposes prior to use.

EXAMPLE VII

As noted in formulation 4 of the previous example the use of a 2,4-DP acid falls within the scope of the present invention in combination with methanearsonic acid. Such a composition also falls within the scope of the present invention. As another example of the use of a formulation within the scope of the present invention and in the method of the present invention involving a 2,4 dichlorophenoxypropionic acid derivative (2,4-DP), a concentrate was formulated wherein 1 gallon of concentrate comprised 2 lbs. of 2,4 dichlorophenoxy-acetic acid derivative and 2 lbs. of 2,4 dichlorophenoxypropionic acid derivative.

This concentrate was mixed with water at a ratio of 1 gallon of concentrate per 100 gallons of water to provide formulation 1.

Formulation 2 was prepared from a concentrate wherein each gallon of concentrate included 1 lb. of 2,4-D herbicide derivative, 1 lb. of 2,4-DP herbicide derivative and 1.3 lbs. of MSMA. Formulation 2 was diluted at a ratio of 2 gallons of concentrate per 100 gallons of water.

Each of the foregoing were applied at a rate of 8 lbs./acre to black berry, salmon berry, ash, salal and vine maple. Approximately eleven months later the following results were observed:

| Species | Formulation 1, percent | Formulation 2, percent |
|---|---|---|
| Black berry | 50 | 70 |
| Salmon berry | 50 | 60 |
| Ash | 60 | 100 |
| Salal | 40 | 60 |
| Vine maple | 20 | 40 |

The improved results achieved through the formulations embodying the present invention including the process of the present invention are readily apparent from the foregoing table which shows the effectiveness of formulations which include 2,4-DP compounds and arsonates. It is clear that where desired, the 2,4-DP compounds may be used alone, and not necessarily in conjunction with a phenoxyacetic component. The present invention also contemplates the use of 2,4,5-TP either alone or in conjunction with 2,4-D or 2,4,5-T or 2,4-DP.

It is to be further noted that MSMA is considered advantageous to the practice of the present invention as compared with MAMA (monoammonium methanearsonic acid). MSMA is not only lower in cost than MAMA, but also MSMA is more readily soluble in water than MAMA, and this is a considerable help in preparing formulations of the present invention.

Furthermore, MSMA has a lower mammalian toxicity than MAMA. It was found that a compound including MAMA (20% by weight) displayed an acute oral $LD_{50}$: 750 mg. per kg. in adult rats. Another compound including MSMA (51.3% by weight) displayed an acute oral $LD_{50}$: 1800 mg. per kg. in young rats.

It is to be noted that the present invention can be provided in a single formulation that has extremely long shelf life and this a distinct advantage since there is no necessity to maintain the phenoxy and arsonic components in separate containers until just prior to use. A formulation including phenoxy and arsonic components which are present together and which has a long shelf life comprises the following:

| | Percent by weight |
|---|---|
| 2,4-D acid (100%) | 28.81 |
| Methanearsonic acid (94.8%) | 10.12 |
| Diethanolamine (60%) | 37.01 |
| Versene acid (sequesterant) | 0.48 |
| Water | 23.58 |
| Total | 100.00 |

In the dry state a single package formulation can be provided as having the following components:

| | Percent by weight |
|---|---|
| 2,4-D (lithium salt) | 30.9 |
| Disodium methanearsonate | 20.0 |
| Sodium sesquicarbonate | 49.1 |
| Total | 100.0 |

The foregoing results clearly demonstrate the surprising and highly unexpected enhancement of results brought about by the combined effects of a phenoxyalkanoic acid compound in combination with an arsonate compound in accordance with the foregoing teachings for control of perennial brush species.

So far as concerns the amount of herbicide to be used, this of course is subject to such considerations as the type of treatment to be made, the area to be treated, the type of undesirable vegetation sought to be controlled and the stage of development of the species being treated. Generally, concentrated herbicidal compositions of the present invention are prepared so as to contain from 5 to about 60% of the active herbicidal components. Compositions which are suitable for "as is" application generally contain from 0.1% to about 10% of the active herbicidal components, although the particular concentrations can be varied as will occur to those skilled in the art.

In applying the formulations of the present invention, consideration must be given to the species of undesirable vegetation involved, the present rate of growth of the undesirable vegetation, the soil, environmental factors influencing the rate and vigor of the undesirable vegetation growth, weather conditions at the time of application and immediately following, the method of application and the dosage to be applied to a given area. Plants in general are most susceptible when they are small and growing rapidly. Early application, therefore, results in better control of the undesirable vegetation with less chemical.

The larger and older the undesirable vegetation, the higher the concentration of herbicidal formulation of the present invention needed to kill them. In view of the foregoing, the rate of herbicide application will have to be adjusted particularly to take into account the fact that plants growing under optimum conditions are relatively susceptible, whereas those growing under adverse conditions tend to be somewhat more resistant but still susceptible to the herbicidal sprays of the formulations of the present invention.

The effectiveness of the formulations of the present invention in small quantities makes it economically sound for vegetation control on large areas, wtih a great saving in labor and cost.

The formulations incorporating the components of the present invention, as set forth hereinafter, are of a consistency and viscosity not too different from water. Therefore, the liquid formulations of the present invention may be applied to the area to be treated by conventional spray equipment in carrying out the process of the present invention. If the formulation of the present invention is based on solids, then application of the same should be effected by using dispersal equipment well known to the art.

In using the aforesaid conventional equipment, the variation of dosage rates can be achieved by changing the nozzle or discharge opening size and spacing or pressure or traveling rates of the spray equipment.

Without further elaboration, the foregoing will so fully illustrate my invention, that others may, by applying current or future knowledge, adapt the same for use under various conditions of service.

What is claimed as the invention is:

1. A process for the control and eradication of perennial woody plants and perennial brush species, said process comprising applying to said plants and brush species a composition comprising (1) 0.15 to 4 parts (calculated $R^1$–$AsO_3H$) of an arsonate compound having the structure:

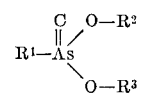

wherein $R^1$ is an alkyl group of from 1 to 3 total carbon atoms; $R^2$ and $R^3$ are selected from the group consisting of H, $NH_4$, diethanolamine, triethanolamine, alkali metals and one ion of a divalent metal and (2) one part of a herbicidal phenoxyalkanoic acid compound and corresponding functional derivatives thereof selected from the group consisting of 2,4-dichlorophenoxypropionic acid, 2,4,5-trichlorophenoxypropionic acid and mixtures thereof, said arsonate compound being present in a non-herbicidal amount.

2. The process of claim 1 wherein said arsonate compound is applied at a rate ranging from 0.75 lb. per acre to 8 lbs. per acre.

3. The process of claim 1 wherein said divalent metal ion is selected from the group consisting of calcium, zinc, magnesium, strontium, barium and cadmium.

4. The process of claim 1 wherein said arsonate compound is a monosodium acid methanearsonate.

5. The process of claim 1 wherein said arsonate compound is disodium acid methanearsonate.

References Cited

UNITED STATES PATENTS

| | | | |
|---|---|---|---|
| 2,678,265 | 5/1954 | Schwerdle | 71—94 |
| 3,466,163 | 9/1969 | Kirch | 71—97 |

JAMES O. THOMAS, JR., Primary Examiner

U.S. Cl. X.R.

71—116, 117